United States Patent [19]

Osterstrom et al.

[11] Patent Number: 4,806,075

[45] Date of Patent: * Feb. 21, 1989

[54] TURBOMOLECULAR PUMP WITH IMPROVED BEARING ASSEMBLY

[75] Inventors: Gordon E. Osterstrom, San Diego, Calif.; Leonid Livshits, Morton Grove; Mark B. Renz, Northbrook, both of Ill.

[73] Assignee: Sargent-Welch Scientific Co., Skokie, Ill.

[*] Notice: The portion of the term of this patent subsequent to Jun. 23, 2004 has been disclaimed.

[21] Appl. No.: 941,815

[22] Filed: Dec. 15, 1986

Related U.S. Application Data

[63] Continuation-in-part of Ser. No. 767,657, Aug. 20, 1985, Pat. No. 4,674,952, which is a continuation of Ser. No. 539,977, Oct. 7, 1983, abandoned.

[51] Int. Cl.[4] .............................................. F04D 29/04
[52] U.S. Cl. ................. 415/170 R; 384/399; 384/115
[58] Field of Search ................. 416/110, 111, 90, 142, 416/170 R; 384/399, 398, 115, 118

[56] References Cited

U.S. PATENT DOCUMENTS

| | | | |
|---|---|---|---|
| 2,913,989 | 11/1959 | Boardman et al. | 415/112 |
| 3,058,785 | 10/1968 | Steele | 384/114 |
| 3,392,910 | 7/1968 | Tanzberger | 415/111 |
| 3,398,929 | 8/1968 | Schreiber et al. | 415/111 |
| 3,459,430 | 8/1969 | Ball | 415/169 A |
| 3,549,216 | 12/1970 | Sutyak | 384/115 |
| 3,644,051 | 2/1972 | Shapiro | 415/90 |
| 3,652,186 | 3/1972 | Carter | 417/370 |
| 3,671,137 | 6/1972 | Ball | 415/104 |
| 3,753,623 | 8/1973 | Wutz | 417/424 |
| 3,832,084 | 8/1974 | Maurice | 415/90 |
| 3,969,042 | 7/1976 | Bachler | 417/354 |
| 4,036,565 | 7/1976 | Becker | 417/420 |
| 4,204,718 | 5/1980 | Bosco | 308/15 |
| 4,427,309 | 1/1984 | Blake | 384/286 |
| 4,573,808 | 3/1986 | Katayama | 415/111 |
| 4,674,952 | 6/1987 | Osterstrom | 415/170 R |

FOREIGN PATENT DOCUMENTS

| | | |
|---|---|---|
| 1576972 | 7/1970 | Fed. Rep. of Germany . |
| 2263612 | 7/1974 | Fed. Rep. of Germany . |
| 2309665 | 9/1974 | Fed. Rep. of Germany ........ 415/90 |
| 2413483 | 10/1974 | Fed. Rep. of Germany . |
| 2634821 | 2/1978 | Fed. Rep. of Germany ...... 384/398 |
| 2219320 | 9/1974 | France . |
| 212395 | 12/1982 | Japan . |
| 614121 | 12/1948 | United Kingdom ................ 384/398 |
| 885954 | 1/1962 | United Kingdom . |
| 1512952 | 6/1978 | United Kingdom ................ 384/118 |

OTHER PUBLICATIONS

Osterstromg G. Methods of Experimental Physics, vol. 14, 1979, Academic Press, pp. 247-273, "Turbomolecular Vacuum Pumps".

Baumeister, et al., Mark's Standard Handbook for Mechanical Engineers, 8th Ed., 1978, McGraw Hill, pp. 8-120 to 126, "Fluid Film Bearings".

Creamer, R. H., Machine Design, 2nd Ed., 1976, Addison-Wesley Publishing, pp. 77 to 79, "Bearings".

Hindhede, et al., Machine Design: A Practical Approach, 1983, John Wiley & Sons, pp. 458 to 459, "Sliding Bearings".

Taylor, C., The Internal Combustion Engine in Theory and Practice, 1968, MIT Press, pp. 509 to 510, "Engine Bearings".

Deutschman, et al., Machine Design: Theory and Practice; 1975 MacMilliam Publishing, pp. 405 to 440, "Journal Bearings & Lubrication".

Oberg et al., Machinery's Handbook, 1980, Industrial Press, pp. 558-564, "Journal Bearings".

Primary Examiner—Robert E. Garrett
Assistant Examiner—John T. Kwon
Attorney, Agent, or Firm—Lockwood, Alex, FitzGibbon & Cummings

[57] ABSTRACT

A single-ended turbomolecular vacuum pump operable in the free molecular flow pressure range having an improved bearing assembly located between the motor and the pump rotor discs is disclosed. The improved bearing assembly which is of the "plain" or "sleeve" liquid lubricated type with the bearing surfaces has a relatively high ratio of journal diameter to bearing axial length and includes lubricant ports radially disposed about both the centers of the bearing and the journal. The improved bearing assembly is characterized by improved heat transmission capabilities, high tolerance for misalignment, long life and significant reduction of pump vibration.

25 Claims, 5 Drawing Sheets

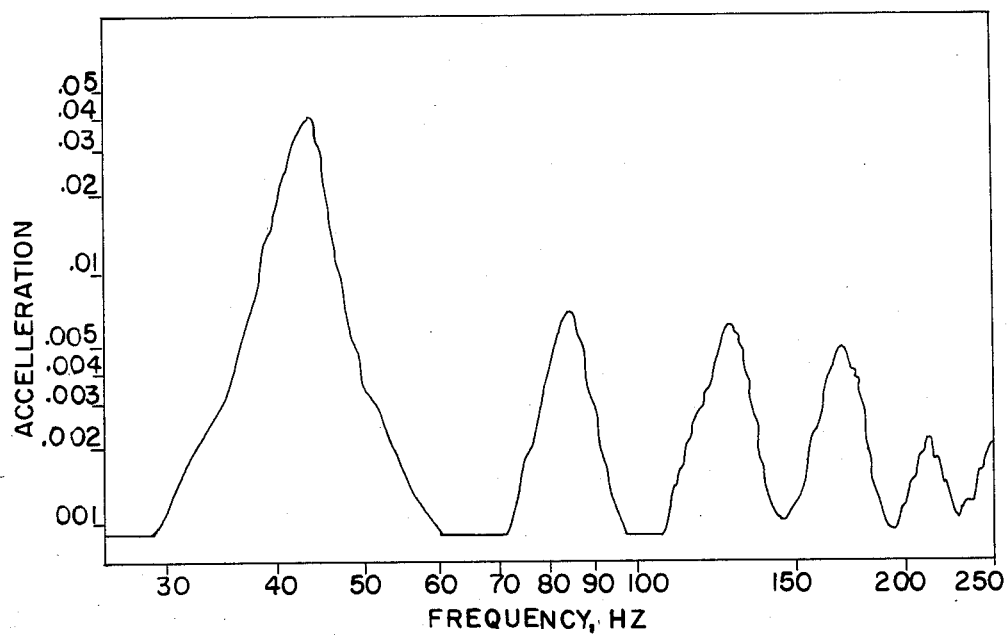
FIG-6-
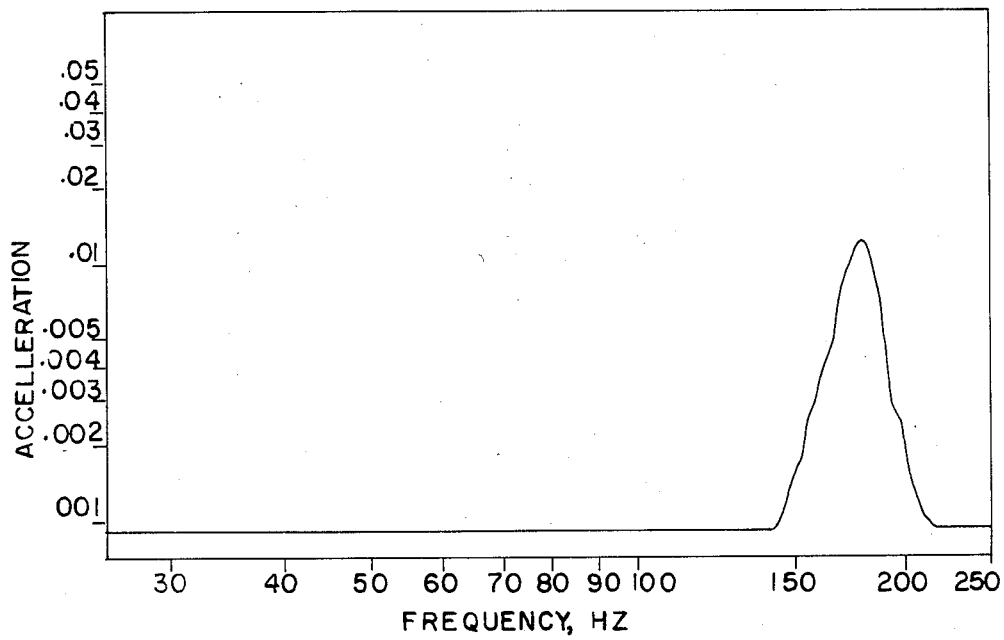
FIG-7-

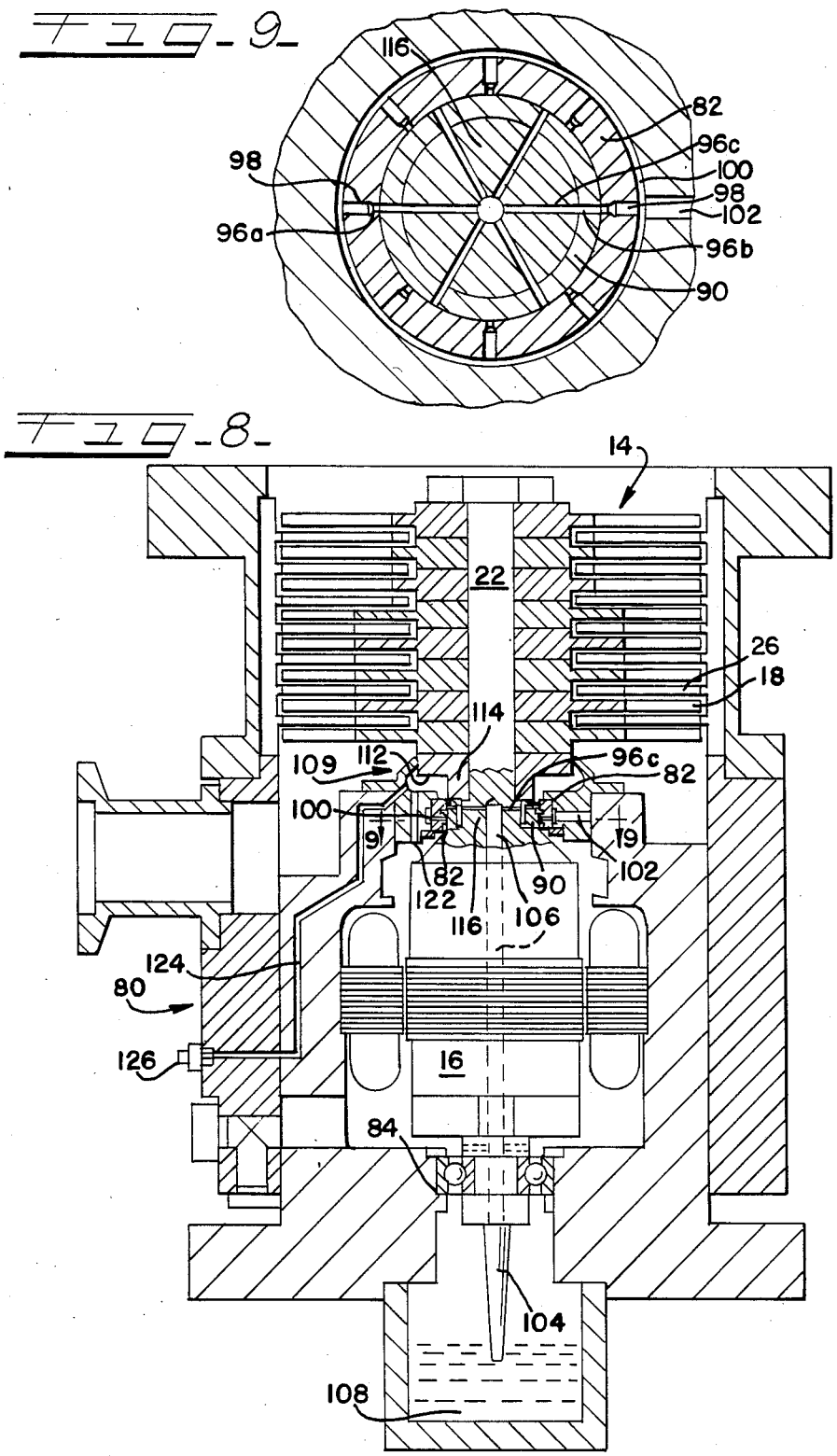

TURBOMOLECULAR PUMP WITH IMPROVED BEARING ASSEMBLY

REFERENCE TO RELATED APPLICATIONS

This application is a continuation-in-part of application Ser. No. 767,657 filed Aug. 20, 1985, now U.S. Pat. No. 4,674,952, said application Ser No. 767,657 being a continuation of Ser. No. 539,977, filed Oct. 7, 1983, now abandoned.

BACKGROUND AND SUMMARY OF THE INVENTION

The present invention generally relates to vacuum pumps, and more particularly, to pumps known as turbomolecular pumps characterized by "bladed" rotor and stator construction with running clearances in the millimeter range which are particularly effective in the free molecular flow range. More particularly, this invention is directed to an improved bearing system for vertical rotating shafts and is especially useful for vacuum pumps of the single ended type which have an upper bearing between the motor and the pump rotor discs. In this regard, an important aspect of the present invention concerns a bearing assembly for a single-ended turbomolecular pump which is characterized by improved heat transmission capabilities and a high tolerance for misalignment whereby noise, vibration and wear are minimized and longer bearing life is achieved.

In conventional single-ended vertical turbomolecular vacuum pumps, two vertically disposed bearings are commonly employed to support the rotating system with the mass center of the rotating system usually being concentrated slightly below the upper bearing. Maintaining stability in rotating machines of this type requires great care due to the very high rotational speeds which are utilized in these machines, particularly in the order of 40,000 to 50,000 r.p.m. or higher. Replacing worn bearings in these machines involves the disassembly of the rotating system which by itself is a laborious and time consuming process. Unfortunately, because the natural spin axis is slightly different with each bearing replacement reassembly, the rotor system can never be in perfect balance on its bearings. Ill-balanced bearings can contribute to eccentric rotation of the pump shaft and intolerable and undesirable vibration. A sufficiently compliant bearing mount is therefore required for bearing replacement by the user without rebalancing facilities.

In addition to supporting the rotating system, bearings also serve to conduct heat away from the rotor. Most commercially available turbomolecular pumps employ rotors of aluminum alloy which are subject to loss of strength starting at about 148° C. Since turbomolecular pump rotors operate in a thermally insulating vacuum, the only way the rotor can be cooled, without unduly complicating the system, from common heat input such as bearing friction, integral motor losses and gas friction, is by conduction through the bearing lubricant and by radiation. It is therefore critical to provide adequate bearing cooling in high speed machinery.

Heretofore, the majority of turbomolecular vacuum pumps have utilized oil lubricated ball bearings. Other types of bearings such as air or gas film bearings and magnetic bearings have also been employed but have not achieved widespread popularity for a variety of reasons. For instance, the low stiffness provided by magnetic bearings and the complexity and expense of the electronic control systems necessary to maintain them result in operational limitations and reliability problems.

Ball bearings are well adapted to relatively high speed applications because their friction increases only moderately as the speed increases, and they do not generally develop internal instability with increasing speed. Furthermore, they offer a great reserve of strength and rigidity to handle extraordinary air inrush thrust loads. These bearings are located at the discharge side of the rotor disc cascade, and oil vapors associated therewith do not penetrate upstream to the turbo inlet.

However, while the reliability of the ball bearings currently available is very high, they have certain inherent deficiencies which severely limit their use in high speed turbomolecular pumps. For example, the balls orbiting around the axis at very high angular velocity cause substantial contact forces between the balls and raceway which are far greater than those imposed by the rotor alone. Misalignment of the bearing raceways relative to the rotor axis converts these forces to undesirable noise and wear which eventually requires replacement of the bearing. Additionally, ball bearings typically rely upon a ball separator, which if ruptured in a failure of the bearing imparts a dissymetry to the bearing assembly which may permit the rotor to tilt and contact the stator. At high rotational speeds, this contact may lead to catastrophic failure of the pump. Moreover, ball bearings, when misaligned are susceptible to extreme wear which eventually requires replacement of the bearing. Precise machining and meticulous care in handling and assembling the parts are, therefore, a necessity to minimize misalignment.

In addition to the handling and assembly constraints, the heat transmitting capabilities of ball bearings limit the effective operating range of a turbomolecular pump. Two principal sources of heat input to a turbomolecular pump rotor system are oil friction and gas friction. The gas friction heat input is proportional to the pressure range in which the rotor is operating, i.e. lower ga friction at lower pressures and higher gas friction at higher pressures. The heat generated from gas friction is usually dissipated by the flow of oil through the bearing supporting the rotor. However, the flow of oil required for a typical ball bearing assembly is proportional to both its heat transmission capability and the amount of friction generated by the oil itself.

Therefore, when gas friction heat input is negligible, a ball bearing with minimum oil is best while when gas friction heat input is high, maximum oil is best. However, the concomitant effect of increased oil friction with increased oil throughout eventually produces a counter-balancing effect to the heat transmission capability of the bearing which limits the high pressure end of the useful range of the pump and thereby it curtails the use of turbomolecular pumps in the higher pressure range often needed for sputter and dry etch applications used in integrated circuit manufacture.

At first glance ordinary sleeve-type bearings appear to present a reasonable alternative to the use of ball-bearings in high-speed rotational machinery. However, it has been widely recognized that the use in vertical rotating machinery of sleeve-type bearings which rely upon oil-film lubrication between the rotating shaft and bearing sleeve is limited by the unusual vibrations which commonly occur at high rotational speeds. These vibrations, which have been referred to in the art as "oil whip", "oil whirl", "shaft whip" or "shaft whirl" are caused by a pumping effect which the shaft has on the oil which increases the oil pressure at some points more so than at others around the circumference of the shaft. This uneven oil pressure distribution exerts a force on the shaft and causes the shaft to maintain an eccentric rotation within the sleeve. Self-excited vibrations of undesirable magnitude are set up, which are commonly referred to as pump noise. It has been further recognized in the art that when the angular velocity of the oil, $\omega_o$ is equal to or smaller than half the angular velocity of the shaft, $\omega_v$, the oil whip develops (i.e., if the shaft runs faster than twice its critical speed). The efficiency of the pump is severely reduced due to these vibrations. Therefore, it is desirable to provide a sleeve-type bearing for high speed rotating turbomolecular pumps that significantly reduces the vibrations due to oil whirl.

The thermally insulating vacuum present in the operational environment of turbomolecular pumps also presents a limitation on the use of conventional bearings. The only significant points of contact for transfer of heat generated by friction from the collisions of gas molecules on the rotor blades is the surfaces of the pump bearings. Excessive heat applied to the bearings can cause both a high-temperature breakdown of the lubricant and bearing failure. Therefore, it becomes necessary to provide an adequate oil flow to the clearance between the bearing and the journal. However, the flow of oil supplied to this clearance is important in that excessive oil can create hydrodynamic friction and turbulence in the oil. Therefore, if the oil flow is too great excessive lubrication friction occurs and the bearing lubrication tends to introduce heat into the system as opposed to removing it.

Attempts have been made to correct these problems and have included the use of specific bearing surface configurations such as interrupted bearing surfaces, or arcuately formed "lands" which are separated by axially extending recesses, wherein oil is supplied between the shaft and the bearing at the recesses. See, for example, U.S. Pat. No. 4,427,309. Such a bearing is specifically designed to "float" or rotate within its housing at a speed generally less than that of the shaft. These recesses not only absorb the excess oil pressure formed by oil whirl but also tend to introduce turbulence into the oil flow which increases the heat input due to lubricant friction. An extra oil film and delivery system must also be provided between the bearing outer surface and the housing. This additional oil introduces additional lubricant friction to the bearing. Furthermore, the overall length of such a bearing must be increased over that normally used for such applications because the recesses reduce the load bearing surface of the bearing.

The present invention departs from the prior art and solves the aforementioned problems by providing an improved bearing assembly of the "plain" or "sleeve" liquid lubricated type which can tolerate far more misalignment than a typical ball bearing without increase in noise, wear, or fatigue damage and which has better heat transmission capabilities than a typical ball bearing. Heretofore such bearings have not been employed in turbomolecular pumps because such bearings having a conventional length to diameter ratio would impose far too much fluid friction drag at the speeds employed in such turbomolecular pump.

It has been discovered that when the ratio of journal diameter to bearing length is relatively high, 10:3 or above, the above noted disadvantages are diminished to the point where the frictional drag encountered is less than that obtained with a ball bearing of comparable diameter and a lubricant of comparable viscosity and where there is no appreciable whirl. In addition, when the bearing utilizes a relatively smooth and uniform inner working surface and the lubrication passageways are generally disposed along the center of the journal and the bearing, the oil supplied to the clearance forms a symmetrical oil field therein. A hydrodynamic pressure develops in this oil field which is sufficient to maintain separation of the journal and the bearing surfaces. Consequently, eccentric rotation of the shaft due to oil whirl and the undesirable vibration which accompanies oil whirl virtually disappears and bearing speeds in excess of what were previously attainable in vertical turbomolecular pumps are achieved. In addition, this new bearing assembly has the potential for unlimited life and therefore avoids the meticulous balancing problems of bearing replacement or reassembly.

It is, therefore, a general object of the present invention is to provide an improved turbomolecular pump.

Another object of the present invention to provide a turbomolecular pump with a improved bearing assembly which substantially reduces noise, wear or fatigue damage.

Another object of the present invention is to provide a turbomolecular pump for operation in the free molecular flow range with an improved journal bearing assembly which has improved heat transmission capabilities thereby extending the useful high pressure range of the pump.

It is a further object of the present invention to provide an improved journal bearing assembly for use on vertical turbomolecular pumps which has two journal and two bearing working surfaces.

It is yet another object of the present invention to provide a turbomolecular pump with an improved lubricated journal bearing assembly wherein the lubricant is supplied to the bearing through the bearing and the journal.

Another object of the present invention is to provide an improved turbomolecular pump of the single ended type which incorporates an oil film journal bearing assembly in which a uniform hydrodynamic pressure field is established within the journal-bearing clearance.

Another object of the present invention is to provide an improved turbomolecular pump which utilizes two different oil feeding systems to provide lubrication to the pump.

BRIEF DESCRIPTION OF THE DRAWINGS

These and other objects of the present invention will be apparent from the following detailed description taken in conjunction with the following drawings wherein:

FIG. 6 is a vibration scan of the bearing assembly illustrated in FIG. 4.

FIG. 7 is a vibration scan of the bearing assembly illustrated in FIG. 5.

FIG. 8 is a vertical cross-section of an alternate embodiment of an assembled single ended type turbomolecular pump embodying the bearing assembly of the present invention.

FIG. 9 is a sectional plan view of the bearing assembly depicted in FIG. 8 taken along a staggered line 9—9 passing through oil ports 96a, 96b and 96c.

DESCRIPTION OF THE PREFERRED EMBODIMENT

Although it will be understood that the principles of the invention may be practiced with various pump constructions, the invention will be particularly described herein with reference to embodiments in a single-ended, vertical turbomolecular pump in which the gas inlet flow is parallel to the axis of rotation of the rotor-stator cascade and then passes out a side port to a forepump.

Figure 1:
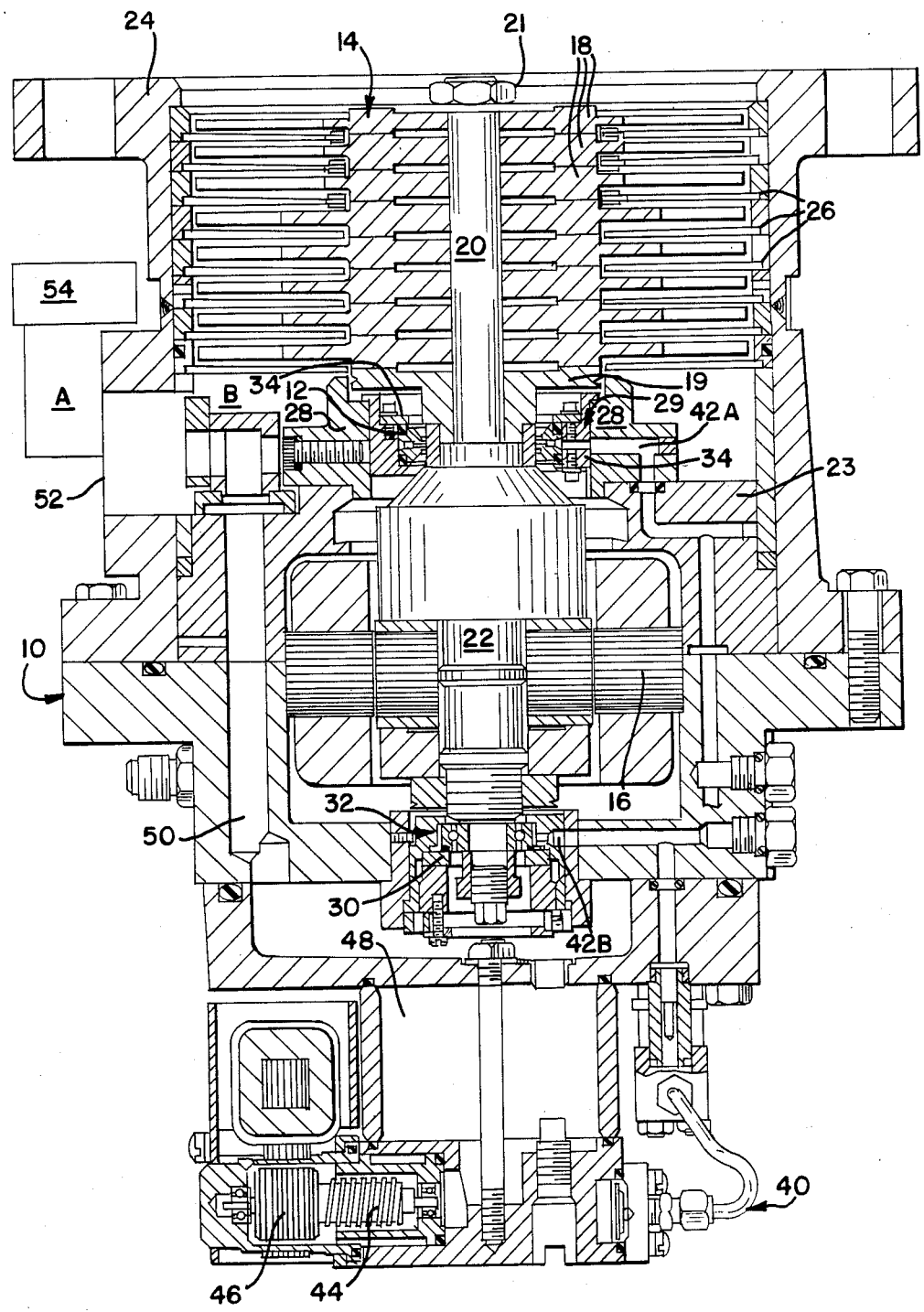
FIG. 1 is a vertical cross-section of an assembled single-ended, vertical turbomolecular pump embodying a bearing assembly of the present invention.

Referring now to the drawings in greater detail, FIG. 1 shows a vertical sectional view of a conventional single-ended vacuum pump 10 embodying the improved bearing assembly 12 of the present invention. The vacuum pump 10 itself includes a turbomolecular pump rotor assembly 14 and integral electric motor 16 to drive the rotor assembly 14.

Referring now to the rotor assembly 14 in greater detail, the rotor itself consists of a series of rotating discs 18 which are fixed to a rotor hub 19. The rotating discs 18 are preferably constructed of a high-strength aluminum alloy discs of the Shapiro type as is described in U.S. Pat. No. 3,644,051, the disclosure of which is herein incorporated by reference. The rotor shaft 20 is connected directly to the pump shaft 22 of the electric motor 16 and is thereby directly driven.

The rotor assembly 14 and electric motor 16 are assembled into a rigid inner housing 23 which is itself encased in pump outer housing 24. Affixed to the pump outer housing 24 and positioned so as to be interposed between each of the rotor discs 18 and immediately adjacent thereto are corresponding stator discs 26 having profiles substantially identical to those of the adjacent rotor discs. This interleaving of rotor discs and stator discs forms, as depicted in FIG. 1 for illustration purposes only, an axial flow rotor-stator cascade of eight stages which include eight moving rotor discs 18 and eight stationary stator discs 26.

The combined rotor 14-motor 16 assembly is supported in the inner housing 23 by an upper bearing 12 and a lower bearing 32. The upper bearing 12, which will be described in greater detail below, is positioned between the pump rotor 14 and the motor 16 and is held fixed in position and restrained against rotational movement between the lower retainer ring 34 and the upper retaining ring 36 of retaining assembly 29. The upper bearing 12 provides the main lateral restraint for the pump shaft 22 and the rotor assembly 14. This vertical type of turbomolecular pump construction results in a pump having a rotor of relatively light mass as compared to existing turbomolecular pumps of horizontal construction and other single-ended pumps in which the rotor assembly is supported on a cone-type bearing and the blades depend downwardly over the electromotive drive.

In this regard, the upper bearing 12 primarily serves to steady the rotor assembly 14 against vibrations as it is brought up to speed and to resist the jarring motions of the pump encountered in lower speed ranges. The lower bearing 32 located below the motor 16, as depicted, may be of the ball bearing type and is mounted on an elastomeric "O" ring 30 to compensate for small eccentricities in the pump assembly and to provide vibrational damping. Lower bearing 32 also has bidirectional thrust capability, supports the rotor down weight, and provides emergency air inrush upthrust resistance when air is suddenly admitted at high rotating speeds. It will be appreciated that the lower bearing 32 can be of any conventional bearing type so long as it provides adequate radial and bidirectional thrust capabilities.

Directly below the motor 16 is an oil pump system for the upper bearing 12 and through a lower oil port 42a for the lower bearing 32. The oil pump system preferably includes an oil flow sensor, not shown, for the purpose of shutting off the drive power to the rotor in the event of a loss of lubrication. The lubrication system further includes a worm gear 44 powered by a sealless "canned rotor" motor 46 and an oil reservoir 48 to which the oil drains by gravity through flow passages 40 after leaving the bearings above. It should be noted that other types of oil lubrication systems such as an axial suction system could equally be employed with the current invention.

Turbo pump 10 has an outlet port 52 connected to a forepump 54 through an outlet throttle, not shown. The forepump side, zone "A", of the throttle is at a lower pressure than zone "B", the lower side of the rotor-stator cascade. To reduce the possibility of contamination of the pumping medium by any turbo pump oil, the oily sections of the turbo pump 10 are connected to zone. A through flow passages 40 such that, during evacuation, any foam from deaerating oil passes to the forepump and does not rise up through the bearings into the turbobody cavity of the pump.

With the exception of the new bearing assembly 12, the foregoing described elements of pump 10 as well as those other elements shown in FIG. 1 but not particularly described herein are generally conventional, do not form a necessary part of the invention, and will therefore not be further described in detail herein.

Figure 2:
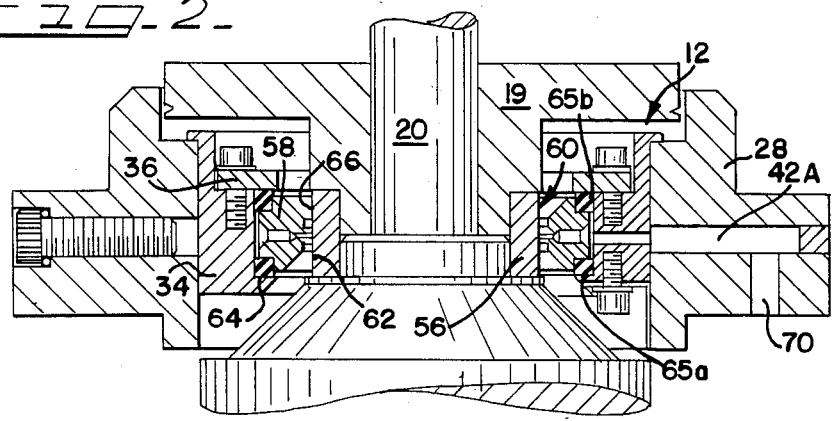
FIG. 2 is a vertical cross-section of a bearing assembly in accordance with the present invention.
Figure 3:
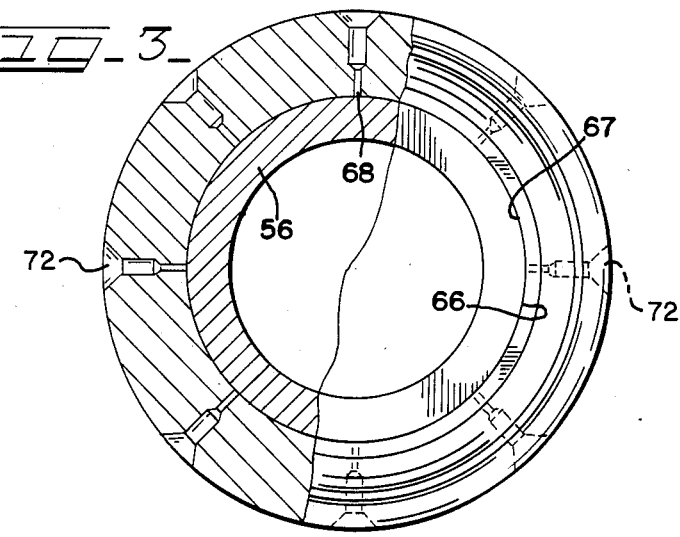
FIG. 3 is a plan view of the bearing assembly of the present invention with a partial cutaway.

Referring now to FIGS. 2 and 3 a bearing assembly 12 of the plain or sleeve type is shown to include a shaft 20 having journal portion 56 located thereon, a bearing 58, and a lubricant film 60 therebetween.

In the illustrated embodiment, a journal 56, in the form of a separate sleeve, is integrally secured to the rotor shaft hub 19 at the lower end of the rotor shaft 20 by press fitting and co-rotates therewith. The journal 56 preferably has a polished surface. It will be appreciated, however, that the hub 19 and shaft 20 can, if suitably dimensioned and polished, serve as the journal itself without the need for a sleeve.

As shown in FIG. 2, the bearing 58 is in the of an outer ring generally concentric with journal 56 and includes an inner working surface 62 adjacent to journal sleeve 56. Preferably, the bearing is composed of a material that can withstand the buffeting of the rotor when the pump is being brought up to speed and which is resistant to the corrosive effect of certain high molecular weight gases encountered by turbomolecular pumps. It is also advantageous for the bearing material to possess some inherent lubricity to freely allow rotation of the rotor shaft 20 in the early operational stages when the pump is being brought up to speed.

The material selected for the bearing should preferably share a relatively low thermal expansion properties and relatively high surface wear characteristics. A low coefficient of thermal expansion is preferred so that the bearing will not thermally expand to the point where the reduced radial clearance is reduced to zero, as the bearing might then clinch the rotor and might possibly lead to a catastrophic failure of the pump. A high surface wear characteristic is desired to resist the contact of the pump shaft at low start-up speeds. In this regard, the use of poly(amide-imide) resins such as TORLON ® manufactured by Amoco Chemicals Corporation, combinations of graphite and PTFE (polytetrafluoroethylene), bronze, and aluminum-silicon alloys have all been found to be successful.

A lower bearing retainer ring 34 surrounds the bearing 58 and may include a annular ridge or channel 64 having inner elastomeric support surfaces 65a, 65b thereon. The elastomeric support surfaces are depicted in the preferred embodiment as O-rings 65a, 65b (FIGS. 1, 2). The O-rings 65a, 65b, in a compressed state, are captured between the bearing 58 and the upper and lower bearing retainer rings 34, 36. The O-rings are capable of additional compression as well as expansion and thereby serve both to dampen any vibration incurred by the rotor assembly and compensate for an shaft or rotor eccentricity that may be encountered during the start-up of the pump prior to lubricant introduction.

Journal 56 and bearing 58 are dimensioned so as to provide a suitable clearance therebetween for lubricant film 60. In this regard, the diametrical clearance is typically on the order of 1.5 thousandths of an inch (0.0015"), that is the radial clearance between the bearing working surface 62 and the journal outer diameter bearing surface 66 is typically around 3.0 thousandths (0.003"). For example, in a pump having an approximate 1.000 inch O.D. journal, the I.D. of the bearing surfaces would be approximately 1.003 inches.

Bearing ring 58 has radial lubricant inlet ports 68 circumferentially disposed to permit the efficient passage of lubricant, to the radial clearance between journal 56 and bearing 58 and to supply a uniform and effective oil film to the radial clearance. The lubricant ports 68 are preferably disposed within the axial length of the bearing inner working surface 62 at approximately the center of bearing 58 such that the oil film 60 is uniformly and effectively distributed in the radial clearance during operation of the pump. The maximum centrifugal force encountered by the oil occurs in the radial clearance of the center of line contact. At a critical rotatonal speed it has been found that a hydrodynamic pressure is created in the oil which no longer contributes to eccentric rotation caused by oil whirl, but which centers the shaft in the bearing and allows greater operational speeds of the pump and greater bearing speeds which are approximately equal to and sometimes greater than twice the typical recommended application speed by the bearing manufacturers.

It is to be understood that the area that defines the working surface 62 of the bearing 58 may instead be located on journal 56 or both and the benefits and advantages of the present invention will also be obtained. In such an instance, the lubricant ports 68 would be disposed on the journal outer surface 66 and oil would be supplied to the radial clearance by means of an oil supply system disposed within the center of the shaft, as will be explained in greater detail below.

When the critical pump rotation oil speed is attained, lubricant is admitted to inlet ports 68 under pressure from lubricant pump system 40 through inlet channel 70 by way of inlet reservoir 72 that is present between the bearing 58 and the lower retaining ring 34. The inlet reservoir 72 and channel 70, which may have any volumetric configuration, are illustrated in the preferred embodiment as having conical and frusto-conical shapes, respectively, whereby the volume of lubricant contained therein is greater than the volume in inlet ports 68. This provides not only additional pressure to induce lubricant flow through inlet ports 68, but also serves as a partial lubricant reserve in the event of loss of lubrication until the pump is shut down.

In further accordance with the present invention, the ratio of the axial length of the bearing surfaces 62 to the outer diameter of journal 56 is kept low. A suitable range for this ratio extends from about 1:20 to 3:10 with the preferred ratio being about 1:10. This extremely low ratio therefore minimizes the amount of lubricant present in the radia clearance at the bearing-journal interface that can be subjected to shear in operation so that there is reduced frictional fluid drag. Moreover, at high rotational speeds which are above the pump's critical speed, the low bearing surface area and length to diameter ratio tend to counteract the eccentric effect of oil whirl and acts instead to virtually eliminate vibrational eccentricities and to center the pump shaft.

Figure 4:
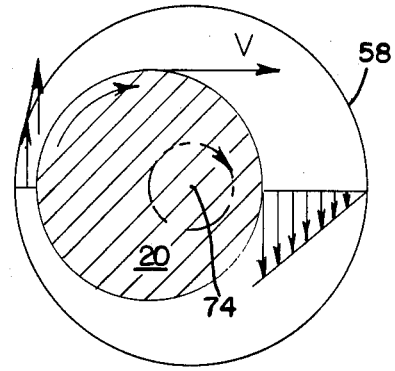
FIG. 4 is a simplified plan view of the pump shaft within a bearing assembly in accordance with the present invention showing the oil pressure distribution therein at low speeds.

During start up and acceleration of the pump, as with any vertical rotating machinery, the lubricant supplied to the bearing begins to whirl about in the radial clearance. As the shaft speed increases, the shaft begins to orbit elliptically around the bearing opening. This shaft orbiting induces a unbalanced oil pressure distribution in the bearing opening (FIG. 4) and leads to the development of oil whirl in the direction of rotation. This oil whirl is caused by the shaft rotation and develops when the speed of the whirl is approximately equal to or less than one-half the speed of the shaft. This speed is commonly referred to as the shaft threshold or critical speed Vcr. When this speed is attained, the system becomes unstable and further increases in shaft speed produce more violent instability until seizure eventually results.

Figure 5:
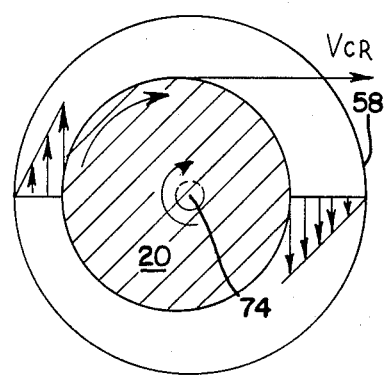
FIG. 5 is a simplified plan view of the pump shaft within a bearing assembly in accordance with the present invention showing the oil pressure distribution attained at critical pump speeds.

However, it has been noted that in pumps using a bearing in accordance with the present invention, at speeds above the shaft critical speed, the oil whirl virtually disappears in that the lubricant in the bearing opening becomes symmetrically distributed therein and a uniform hydrodynamic pressure develops in the oil film to effectively maintain separation of the bearing and journal working surfaces (FIG. 5). An equilibrium state is reached between the centrifugal forces exerted by the oil against the bearing inner surface as the oil is dragged in the radial clearance by the rotating shaft, and the forces exerted by the mass of the rotor and shaft due to rotor imbalance or external influence, thereby maintaining the shaft substantially in the center 74 of the bearing. Any temporary deviation of the shaft from its center position causes an increase in the pressure or force exerted by the oil between the shaft and the bearing at the shaft's point o closest approach to the bearing because the oil tends to move in the radial clearance at a constant speed. Substantially all of the shaft vibration disappears, because in a journal bearing of the present invention, mechanical contact virtually disappears because the hydrodynamic pressure field maintains the shaft in a stable and central radial position with the bearing. Therefore, the bearing of the present invention is self-correcting.

It is important that the oil maintains a constant speed in the radial clearance to ensure elimination of the vibration attributable to oil whirl. Therefore, it is preferable that bearing inner working surface 62 be smooth and substantially uniform so as not to induce any turbulence into the hydrodynamic oil film established in the radial clearance. The rotational speed at which this equilibrium is attained is affected by numerous factors, including the mass and degree of imbalance of the rotor, which determine the amount of external disruptive forces and the nature of the lubricant and the particular dimensional characteristics of the bearing clearance, which determine the lubricant hydraulic forces.

Improved structural stability of the bearing assembly 12 may be provided by preferably tapering the bearing cross-section (FIG. 2), the outer diameter of the bearing 58 having a axial length that is greater than the inner diameter axial length. In a single-ended type turbomolecular pump, the rotor assembly 14 which is supported by the bearing assembly 12 is a relatively light load and hence it is centered within the radial clearance by the pressure of the oil. Therefore the low ratio of the bearing inner diameter does not adversely affect the performance of bearing assembly 12 but rather readily allows greater bearing speeds of approximately double those than were heretofore attainable by a liquid bearing. Typical attainable speeds dependent upon pump shaft diameter range from approximately 282 ft/sec (87 m/sec) for a 2.156 inch diameter shaft to 372 ft/sec (113 m/sec) for a 0.532 diameter shaft. These speeds are more typical of a gas bearing than of a liquid lubricated sleeve bearing.

When the pressure in the stages of a turbomolecular pump is raised from the molecular to the viscous range, the pressure ratio and pumping speed gradually decrease. The pressure range over which this occurs includes the high process pressures normally encountered in semiconductor manufacture. Previously, to achieve those rotor speeds and pressures commonly associated with the sputter and dry etch techniques of semiconductor manufacture, a blower was required in combination with a pump. Pumps used in such applications that were equipped with conventional ball bearings encountered discouraging and prohibitive rotor temperatures. The improved heat transfer capability of the present invention allows a single pump to be extended into the high pressure range wherein a blower-pump combination was previously required.

While not being limited to any particular theory of the invention, it is believed that much of the improved performance of the bearing assembly 12 of the present invention is attributable to the virtual elimination of oil whirl in the uniform lubricant film 60 and the centering effect that the oil lubricant exerts upon the shaft 20 at speeds above the shaft critical speed. Lubricant shear is thereby substantially reduced with a concomitant substantial reduction in lubricant friction, so that the lubricant film provides a better heat transfer path than a typical well-oiled ball bearing. Lubricant film 60 can be composed of any typical vacuum pump wetting lubricant including mineral oils, various synthetic hydrocarbons such as synthetic turbine oil mono and di-esters, and chemically inert fluorocarbons. Typically the lubricant employed will be one chosen having a viscosity in the range of about 7-16 centistokes, with the lower viscosities being preferred. Additionally, the lubricant is preferably supplied under high pressure so as to provide a pressure at the lubricant inlet ports 68 great enough to ensure separation of the bearing 58 and journal 56.

Bearing assembly 12, in addition to having improved heat transmission capabilities, encounters very small internal forces and thereby can tolerate far more misalignment than a typical ball bearing without increase of noise, wear or fatigue. Thus the bearing assembly 12 has the potential for unlimited life and eliminates the problems associated with bearing replacement.

FIGS. 8 and 9 illustrate an alternative embodiment of a vacuum pump 80 utilizing a lubricant film bearing 82 constructed in accordance with the present invention in which the oil is supplied through both the bearing and the journal. Such an embodiment is particularly useful in larger pump applications. The lubricant film journal bearing 82 is used as the pump upper lateral support bearing in combination with a conventional lower bearing assembly 84. Journal 90, in the form of an integral sleeve, is slipped over the rotor hub 116 adjacent the rotor end plate 114 and is co-rotatable therewith. Journal 90 has a greater diameter than the pump shaft 22. The bearing 82 is held stationary and restrained from rotational movement within a bearing retainer assembly 118 between the rotor assembly 14 and the electric motor 16.

Referring to FIGS. 8-12, it can be seen that bearing 82 has a stepped inner surface 86, which includes two inner working surfaces 86a and 86b with a recess 89 axially disposed therebetween. Journal 90 has an outer surface 92 similar to the inner surface of the bearing in that it also includes two radially projecting outer working surfaces 94a and 94b thereon having a recess 95 axially disposed therebetweeen. The working surfaces of both the bearing 82 and journal 90 are preferably substantially uniform so as to be conducive to forming an oil film therebetween in operation.

Figure 12:
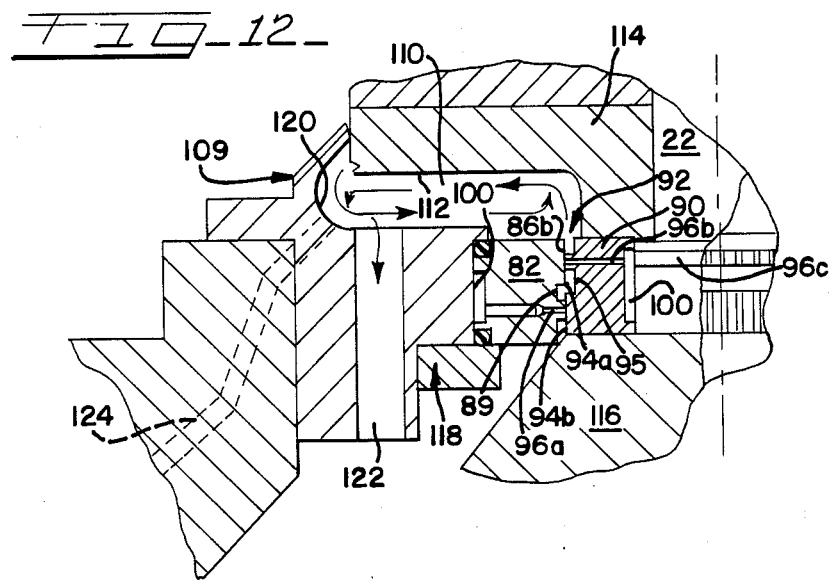
FIG. 12 is an enlarged view of a portion of FIG. 8 taken at the bearing-journal interface.

As shown FIGS. 8 and 12, the axial length of the first journal working surface 94a is shorter than the axial length of the first bearing working surface 86b. Likewise, the axial length of the second bearing working surface 86a is shorter than the axial length of the second journal working surface 94b. In accordance with the present invention, the total axial length of the two bearing surfaces, 86a, 86b is substantially reduced with respect to the journal diameter, falling within the range discussed above, namely, approximately 1:20 to 3:10.

Figure 10:
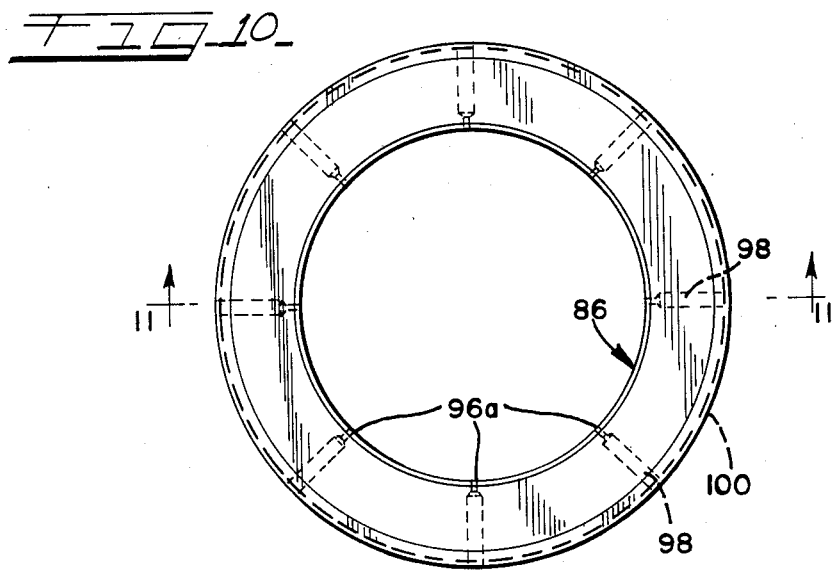
FIG. 10 is a plan view of a second embodiment of a bearing assembly in accordance with the present invention.
Figure 11:
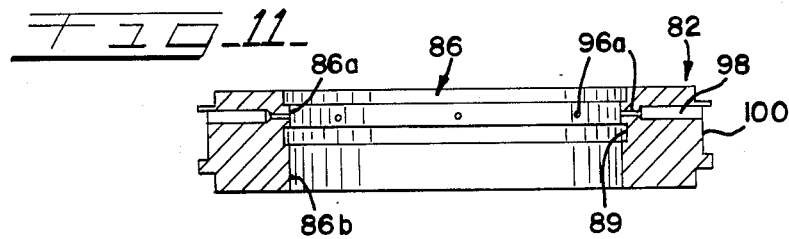
FIG. 11 is a vertical cross-section of the bearing assembly of FIG. 10.

One working surface of both the bearing 82 and journal 90 has a plurality of oil ports 96a, 96b preferably symmetrically disposed about the circumference of the individual working surface. These oil ports 96 are also axially disposed at approximately the center of the bearing and journal working surfaces 86 and 94, respectively. As seen in FIGS. 9-11, an inlet reservoir 98 is preferably provided radially outwardly of each of the oil ports 96 present in bearing 82 and all such reservoirs 98 may be joined by a channel 100, to which oil is supplied by way of an oil pump system 102. The inlet reservoir 98 and channel 100 may further have any volumetric configuration, and if the volume of lubricant provided therein is greater than the volume in oil ports 96, the channel 100 can serve as a partial lubricant reserve if any malfunction occurs in the pump lubrication system.

Additional radial lubricant ports 96c are present in the shaft 22 and extend radially to communicate lubricant to the journal at journal working surface 94a. These ports 96 are preferably symmetrically disposed about journal 90 and aligned with the adjacent bearing inner working surface 86b at substantially the center of line contact so as to form an effective lubricant film bearing with the lubricant pressure attained at the pump critical speed assuring separation of the journal 90 and bearing 82. Additionally, the radial clearance between the bearing 82 and the journal 90 is less than the clearance between adjacent rotor blades 18 and stator blades 26 of the pump rotor and stator assembly.

Fluid communication means 104, by way of a conical bore 106 through the shaft 22 and motor provides a conduit for the transmission of lubricant from a lubricant reservoir 108 to the journal lubricant port 96b. The bore 106 extends axially and longitudinally within the shaft 22. Lubricant is transmitted through the journal 90 to the journal outer working surface 86b by any suitable oil pump, although a centrifugal oil pump of the hollow spindle type that is commonly used with turbomolecular pumps is especially well suited for use with the present invention.

The pump 80 may also include an oil catching assembly 109 (FIG. 12) to recover any lubricant escaping due to end leakage in which a horizontal annular cavity 110 is disposed between the outer surface 112 of the rotor assembly end plate 114 and the bearing retaining assembly 118. The annular cavity 110 includes, at its outermost radial extent an arcuately-shaped wall 120 having a drainage passageway 122.

Any slight amount of oil that leaves the journal bearing 82 due to bearing end leakage is slung outwardly into the annular cavity 110 by the centrifugal force caused by the rotation of the pump (as represented by the arrows in FIG. 12). When the pump is run at high rotational speeds, a hydrodynamic seal is developed which creates pressures in the bearing area that are higher than the pump outlet pressure, thereby substantially preventing pumped gases from entering the bearing area. A chemically inert flurocarbon oil can be used for lubrication in a journal bearing of the present invention and now allows the pump to be used for pumping aggressive or corrosive gases without damaging the bearings. Additionally, it has been discovered the use of the gas purge system 124, 126 does not affect the seal or pressures in the bearing cavity.

Accordingly, it has been discovered that, in a turbo-type vacuum pump employing a bearing assembly made according to the criteria set forth herein unexpectedly excellent results have been made possible which were not heretofore believed attainable with standard liquid film bearings or with a typical ball bearing of comparable dimensional characteristics and with lubricants of comparable viscosity.

While in the foregoing specification certain embodiments of this invention and a number of associated advantages and characteristics have been described in detail, it will be appreciated that modifications and variations therefrom will be apparent to those skilled in the art. Accordingly, this invention is to be limited only by the scope of the appended claims.

What is claimed is:

1. In a single-ended vertical turbomolecular vacuum pump which is adapted to operate in the free molecular flow pressure range in a thermally insulating vacuum, said pump including a rotor-stator assembly which is mounted above a motor, the rotor-stator assembly including a plurality of rotor blades mounted to a central pump shaft which is co-axially aligned with a drive shaft of said motor, said plurality of rotor blades being interleaved with a plurality of stator blades to define a series of pump stages which are interposed between an inlet and an outlet of said turbomolecular vacuum pump, the improvement comprising a multiple journal-bearing assembly mounted between said rotor-stator assembly and said motor, said multiple journal-bearing assembly including at least a first and second pair of journal-bearing components, said first journal-bearing component including a first journal portion which is co-rotatable with the co-axially aligned central pump shaft and motor drive shaft, said first journal portion of the first journal-bearing component having a generally smooth and substantially uniform outer cylindrical working surface having a first journal working surface axial length and a first journal working surface outer diameter, said first journal-bearing component also including a first bearing portion having a generally smooth and substantially uniform inner cylindrical working surface concentrically disposed in a predetermined radial clearance with respect to the outer cylindrical working surface of said first journal component, the working surface of said first bearing portion having a first bearing working surface axial length, said second journal-bearing component including a second journal portion also having a generally smooth and substantially uniform outer cylindrical working surface having a second journal working surface axial length and a second journal working surface outer diameter, said second journal-bearing component also including a second bearing component having a generally smooth and substantially uniform inner cylindrical working surface concentrically disposed in a predetermined radial clearance with respect to the outer cylindrical working surface of said second journal component, the working surface of said second bearing portion having a second bearing working surface axial length, the ratio of the combined axial lengths of the working surfaces of said first bearing portion and said second bearing portion to the respective outer diameters of the working surfaces of each of said first and second journal portions associated therewith being from approximately 1:20 to 3:10, at least one of each of said first journal portion and said first bearing portion including a first port for admitting lubricant from a lubricant source into the radial clearance therebetween, and at least one of each of said second journal portion and said bearing portion including a second port for admitting lubricant from a lubricant source into the radial clearance therebetween, said first and second lubricant ports cooperating with the respective working surfaces of the journal and bearing portions of said first and second journal-bearing components to establish a generally uniform and effective hydrodynamic lubricant film in the radial clearances therebetween, whereby separation of the respective working surfaces of the bearing and journal portions of each said first and second journal-bearing components is maintained at high rotational speeds, a reduction of lubricant shear in said generally uniform lubricant film in said radical clearances and a corresponding reduction of heat build up and pump shaft rotational vibration are obtained enabling said rotor of said rotor-stator assembly to be operated at higher rotational speeds.

2. The single-ended vertical turbomolecular vacuum pump of claim 1 wherein the axial length of the first journal working surface is shorter than the axial length of the first bearing working surface.

3. The single-ended vertical turbomolecular vacuum pump of claim 1 wherein the axial length of the second bearing working surface is shorter than the axial length of the second journal working surface.

4. The single-ended vertical turbomolecular vacuum pump of claim 1 wherein said first port for admitting lubricant into the radial clearance between the working surfaces of said first journal portion and said first bearing portion is located in said first journal portion of said first journal-bearing component.

5. The single-ended turbomolecular vacuum pump of claim 1 wherein said second port for admitting lubricant into the radial clearance between the working surfaces of said second journal portion and said second bearing portion is located in said second journal portion of said second journal-bearing component.

6. The single-ended turbomolecular vacuum pump of claim 5 wherein said first port for admitting lubricant into the radial clearance between the working surfaces of said first journal portion and said first bearing portion is located in said first journal portion of said first journal-bearing component.

7. The single-ended vertical turbomolecular vacuum pump of claim 1 wherein the ratio of the combined axial lengths of the working surfaces of said first bearing portion and said second bearing portion to the respective outer diameter of the working surfaces of each of said first and second journal portions associated therewith is approximately 1:10.

8. The single-ended vertical turbomolecular vacuum pump of claim 1, wherein the radial clearance between the working surfaces of said first bearing and journal portions is less than the axial clearance between adjacent rotor and stator blades of said pump rotor-stator assembly.

9. The single-ended vertical turbomolecular vacuum pump of claim 1 wherein the radial clearance between the working surfaces of said second bearing and journal portions is less than the axial clearance between adjacent rotor and stator blades of said rotor-stator assembly.

10. The single-ended vertical turbomolecular vacuum pump of claim 1, wherein said radial clearance between the working surfaces of each of said first and second journal-bearing components is approximately 0.0010 inch.

11. The turbomolecular vacuum pump of claim 1 wherein said multiple journal-bearing assembly further includes means for damping pump rotor vibration and for compensating for eccentricities in said pump rotor.

12. The single-ended vertical turbomolecular vacuum pump of claim 11 wherein said damping and eccentricity-compensating means includes at least one elastometric support surface for said multiple journal-bearing assembly.

13. The single-ended vertical turbomolecular vacuum pump of claim 1 wherein said second bearing portion includes a plurality of ports to admit lubricant from said lubricant source to said radial clearance between the working surfaces of said second bearing and journal portions, said ports being generally radially and symmetrically disposed about said second bearing working surface so as to provide a uniform film of lubricant in the radial clearance between said second bearing and second journal working surfaces, and said first journal portion includes a plurality of lubricant ports which are generally radially and symmetrically disposed about said first journal working surface to provide a uniform lubricant film in the radial clearance between said first journal and first bearing working surfaces.

14. The single-ended vertical turbomolecular vacuum pump of claim 13 wherein each of the lubricant ports in said second bearing portion includes a generally inwardly tapering hollow cross-sectional passageway which communicates with a lubricant reservoir located outwardly with respect to said lubricant ports.

15. The single-ended vertical turbomolecular vacuum pump of claim 1 wherein the working surfaces of the first and second bearing portions are composed of a material having a relatively low thermal expansion characteristic and a relatively high surface wear characteristic.

16. The single-ended vertical turbomolecular vacuum pump of claim 15, wherein said bearing material is bronze.

17. The single-ended vertical turbomolecular vacuum pump of claim 15, wherein said bearing material is an aluminum-silicon alloy.

18. The single-ended vertical turbomolecular vacuum pump of claim 15, wherein said bearing material is a poly (amide-imide) resin.

19. The single-ended vertical turbomolecular vacuum pump of claim 1 wherein lateral restraint of the rotor is provided by said multiple journal-bearing assembly and a further bearing is present to resist bi-directional axial thrust and to support said rotor assembly during the initial and continued operation of said turbomolecular pump.

20. The single-ended vertical turbomolecular vacuum pump of claim 1 wherein said further bearing is disposed below said motor in generally co-axial alignment with the central pump shaft and motor drive shaft.

21. The single-ended vertical turbomolecular vacuum pump of claim 1 wherein means is provided for catching lubricant escaping from said multiple journal-bearing assembly during operation of said pump.

22. The single-ended vertical turbomolecular vacuum pump of claim 21, wherein said lubricant catching means includes a bearing housing member and a bearing retainer substantially separating said rotor assembly from said pump motor, said housing member having a generally horizontally disposed annular cavity formed therein and generally concentrically disposed with respect to said multiple journal-bearing assembly for catching lubricant escaping from said bearing assembly whereby said escaping lubricant is slung horizontally outwardly into said cavity by the centrifugal force encountered due to the operational high rotationing speeds of said pump.

23. The single-ended vertical turbomolecular vacuum pump of claim 22, wherein said annular cavity has a generally arcuate cross-section and a drain communicating said cavity with a lubricant reservoir.

24. The single-ended vertical turbomolecular vacuum pump of claim 1, further including a neutral gas purge line communicating with said multiple journal-bearing assembly to insulate said bearing assembly from the gas being pumped.

25. The single-ended vertical turbomolecular vacuum pump of claim 1, wherein the first and second journal portions include a cylindrical sleeve having an inner surface which is snugly received on said pump shaft and co-rotatable therewith.

* * * * *